United States Patent
Lee et al.

(10) Patent No.: US 11,968,237 B2
(45) Date of Patent: Apr. 23, 2024

(54) IPsec LOAD BALANCING IN A SESSION-AWARE LOAD BALANCED CLUSTER (SLBC) NETWORK DEVICE

(71) Applicant: Fortinet, Inc., Sunnyvale, CA (US)

(72) Inventors: Yita Lee, San Jose, CA (US); Sen Yang, San Jose, CA (US); Ting Liu, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 230 days.

(21) Appl. No.: 17/710,686

(22) Filed: Mar. 31, 2022

(65) Prior Publication Data

US 2023/0319111 A1 Oct. 5, 2023

(51) Int. Cl.
*H04L 9/40* (2022.01)
*H04L 45/02* (2022.01)
*H04L 45/42* (2022.01)
*H04L 47/125* (2022.01)

(52) U.S. Cl.
CPC ............. *H04L 63/20* (2013.01); *H04L 45/02* (2013.01); *H04L 45/42* (2013.01); *H04L 47/125* (2013.01); *H04L 63/0236* (2013.01); *H04L 63/029* (2013.01); *H04L 63/0435* (2013.01)

(58) Field of Classification Search
CPC ......... H04L 63/20; H04L 45/02; H04L 45/42; H04L 47/125; H04L 63/0236; H04L 63/029; H04L 63/0435
See application file for complete search history.

(56) References Cited

U.S. PATENT DOCUMENTS

| | | | | |
|---|---|---|---|---|
| 11,528,219 | B2* | 12/2022 | Rolando | H04L 63/164 |
| 2004/0268357 | A1* | 12/2004 | Joy | H04L 67/63 |
| | | | | 718/105 |
| 2016/0119819 | A1* | 4/2016 | Ardeli | H04W 76/34 |
| | | | | 370/331 |
| 2016/0294866 | A1* | 10/2016 | Mihelich | H04L 67/1027 |
| 2018/0176153 | A1* | 6/2018 | Reumann | H04L 49/25 |

* cited by examiner

*Primary Examiner* — Cheng-Feng Huang
(74) *Attorney, Agent, or Firm* — Law Office of Dorian Cartwright; Dorian Cartwright

(57) ABSTRACT

A processing blade is assigned from the plurality of processing blades to a session of data packets. The load balancing engine manages a session table and an IPsec routing table by updating the session table with a particular security engine card assigned to the session and by updating the IPsec routing table for storing a remote IP address for a particular session. Outbound raw data packets of a particular session are parsed for matching cleartext tuple information prior to IPsec encryption, and inbound encrypted data packets of the particular session are parsed for matching cipher tuple information prior to IPsec decryption. Inbound data packets assigned to the processing blade from the session table are parsed and forwarded to the station.

18 Claims, 5 Drawing Sheets

IPsec LOAD BALANCING IN A SESSION-AWARE LOAD BALANCED CLUSTER (SLBC) NETWORK DEVICE

FIELD OF THE INVENTION

The invention relates generally to computer networking, and more specifically, for session-aware load balancing of data packets across the multiple processing blades for the plurality of stations over an Internet Protocol security (IPsec) secure channel.

BACKGROUND

Virtual Private Networking (VPN) is one network application for communication between two stations that relies upon the security of IPsec tunnels. In a gateway device, all data packets can be subject to security policies of a private network. This is accomplished by hashing certain headers from data packets for identification, such as a 5 tuple for a data packet (e.g., protocol type, source IP, source port, destination IP, and destination port).

Due to IPsec encryption, it is not currently possible to hash the 5 tuple and thus not possible to identify inbound data packets for applying a security policy by the same member to the same peer gateway. In the IPsec packet sending process, a data packet sent from a station is wrapped with an Encapsulating Security Payload (ESP) header, thereby concealing at least portions of the 5 tuples. Consequently, consecutive session packets may match the same security policy in Security Policy Database (SPDB) but be processed and transmitted by different members to the same peer gateway.

Another problem is synchronizing an Internet Key Exchange (IKE) exchange that is necessary for configuring an IPsec tunnel for operation, across independent members. The same Security Associations (SAs), both IKE and IPsec, are not currently available across different members. All members cannot independently send request and respond as the peer will be confusing. On the other hand, all IPsec traffic processed on a single member, multi-member resource is waste.

Therefore, what is needed is a robust technique for session-aware load balancing of data packets across the multiple processing blades for the plurality of stations over an IPsec secure channel.

SUMMARY

These shortcomings are addressed by the present disclosure of methods, computer program products, and systems for session-aware load balancing of data packets across the multiple processing blades for the plurality of stations over an IPsec secure channel.

In one embodiment, a processing blade is assigned from the plurality of processing blades to scan data packet. The load balancing engine manages a session table and an IPsec routing table by updating the session table with a particular security engine card assigned to the session and by updating the IPsec routing table for storing a remote IP address for a particular session.

In a real-time operation, outbound raw data packets of a particular session are parsed for matching cleartext tuple information prior to IPsec encryption, and inbound encrypted data packets of the particular session are parsed for matching cipher tuple information prior to IPsec decryption. If an existing session is cached, then an assigned processing blade is returned for forwarding the data packet. If an existing session is not cached, a new session is added to cache.

In another embodiment, for a new session, an IPsec tunnel is negotiated between the local network gateway device and a remote network gateway device, and to send information about the IPsec tunnel to the load balancing engine including a remote gateway address and an IPsec tunnel key correlated with a source address and a destination address. The session table and the IPsec routing table are updated for handling subsequent data packets in the session. An encryption engine on the assigned processing blade to detect outbound data packets assigned to the selected processing blade.

Inbound data packets assigned or forwarded to the processing blade from the session table are parsed and forwarded to the station.

Advantageously, a computer device performance is improved with higher throughput of network traffic. Likewise, network performance is improved for the same reason.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for session-aware load balancing of data packets across the multiple processing blades for the plurality of stations over an IPsec secure channel plurality of virtual machines independent of file sharing technology.

One of ordinary skill in the art will recognize many additional variations made possible by the succinct description of techniques below.

Figure 2:
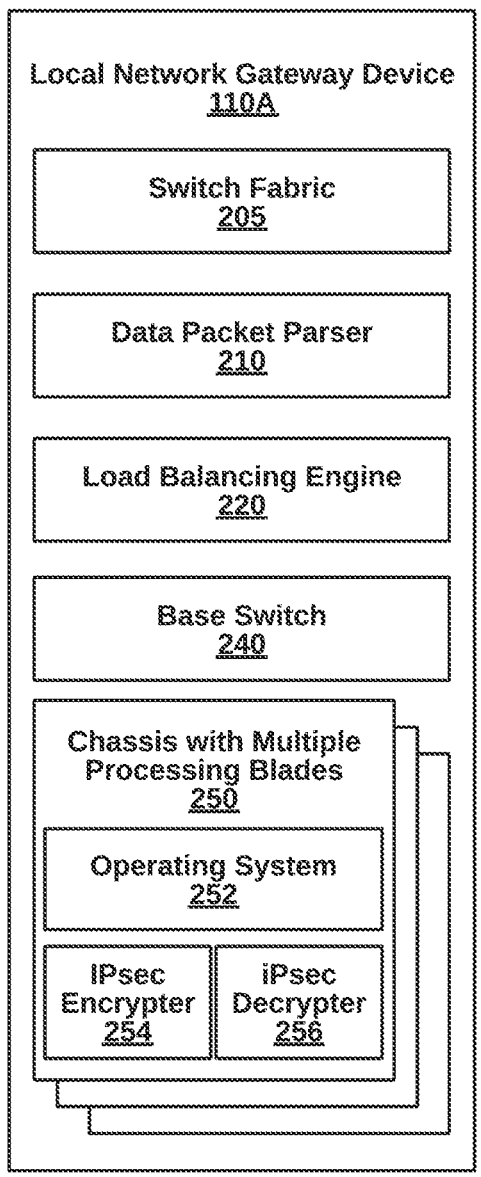
FIG. 2 is a more detailed block diagram illustrating an IPSec load balancing engine of the system 110A of FIG. 1, according to an embodiment.
Figure 3:
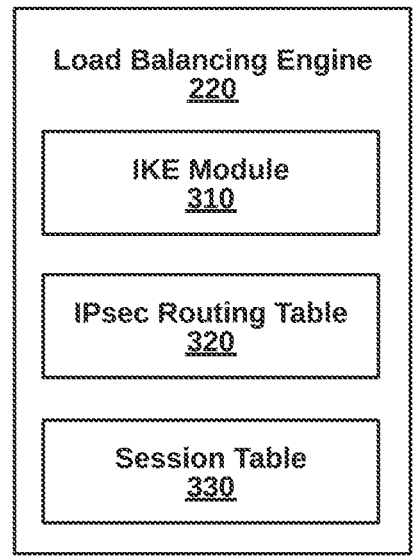
FIG. 3 is a more detailed block diagram illustrating of a processing engine blade chassis connected with multiple processing engine blades, according to an embodiment.

I. Systems for Multi-Blade IPsec Load Balancing (FIGS. 1-3)

Figure 1:
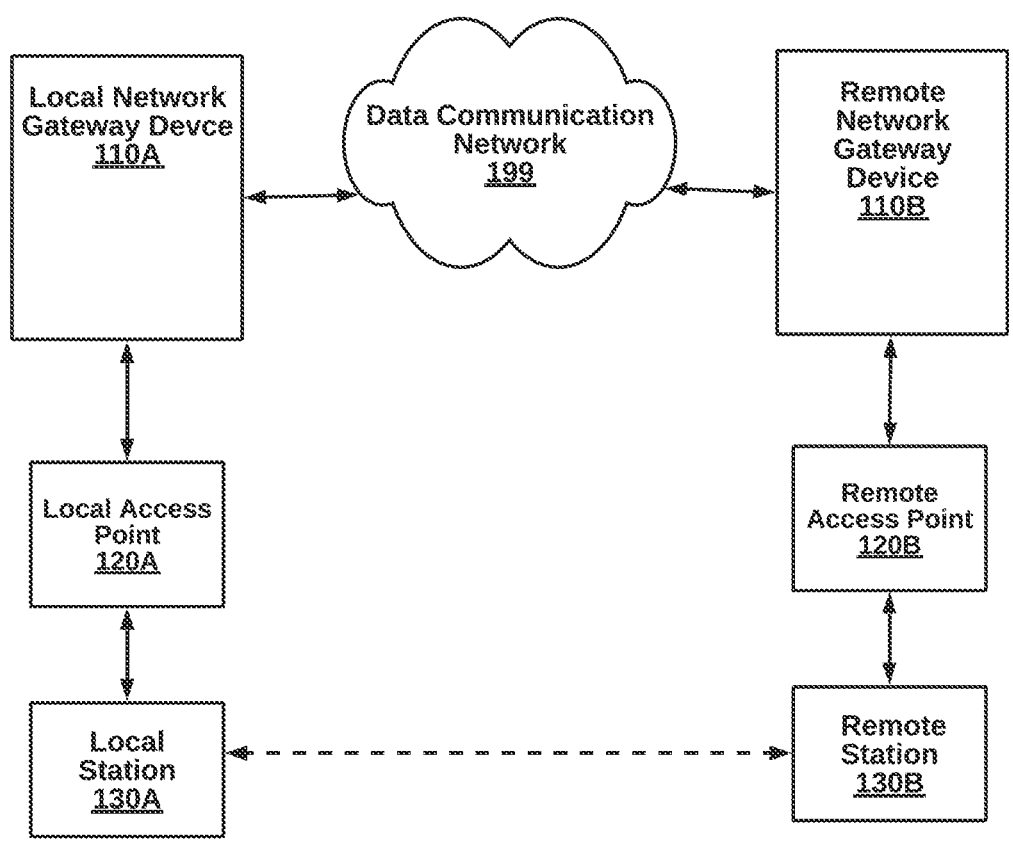
FIG. 1 is a block diagram illustrating a system for session-aware load balancing of data packets across the multiple processing blades for the plurality of stations over an IPsec secure channel, according to an embodiment.

FIG. 1 is a block diagram illustrating a system 100 for session-aware load balancing of data packets across the multiple processing blades for the plurality of stations over an IPsec secure channel, according to an embodiment. The system 100 includes a local network gateway device 110A, a remote network gateway device 110B, local access point 120A, a local station and a remote station, coupled to a data communication network 199. Many other configurations are possible, for example, with additional network components such routers, switches, repeaters, firewalls, and the like. Also, there can be many more or fewer clients in FIG. 1. The system components can be implemented in computer devices with non-transitory source code, such as set forth below with reference to FIG. 6.

The components of the system 100 are coupled in communication over the data communication network. The components can be connected to the data communication system via hard wire. The data communication network 199 can be any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802,11r, and the like. Components can use IPv4 or IPv6 address spaces.

The local network gateway device 110A assigns a processing blade of multiple processing blades to handle data traffic for a specific session. Selection of a particular blade utilizes session-aware load balancing to distribute data traffic over a group of processing blades (e.g., as shown in FIG. 2). A session table and an IP routing table are set up prior to encryption for outbound traffic for managing subsequent data packets from the same sessions by tracking a remote gateway address for an IPsec tunnel for each session. Outbound packet data is formatted in cleartext, meaning that no encryption has been applied. Inbound packet data is formatted in cyphertext, after being encrypted with an IPsec key for transmission over the data communication network 199. In an embodiment, the local network gateway device 110A can be a high throughput device. The multiple processing blades in one case performs as well as multiple, individual gateway devices. Each of the processing blades operate mainly as an independent gateway. Another embodiment applies additional network policies on the data packets prior to forwarding. Additional details about the multiple processing blades are provided below with respect to FIG. 3.

The remote gateway device 110B can be similar to the local network device. Local is relative. Thus, whatever gateway device initiates the IPsec tunnel is a local device. When an IPsec tunnel is initiated from the remote gateway device 110B, it becomes the local device (or initiator) for that session. The same principle applies to the other network devices as well.

The local access point 120A manages the local station 130A and the remote access point 120B manages the remote station 130B. An access point broadcasts beacon frames to indicate presence of wireless SSID service availability. Stations send a connection request to start an authentication and association process. Once connected wirelessly, data packets are passed to gateways for processing to destinations out of a private network. Some of the communications require VPN or a different IPsec application.

FIG. 2 is a more detailed block diagram illustrating a local network gateway device 110A of the system 100 of FIG. 1, according to an embodiment. The local network gateway device 110A includes a data packet parser 210, a session table 220, an IPsec routing table 320, a base switch 240 and a chassis with multiple processing blades 250. The modules can be implemented in source code stored in non-transitory memory executed by a processor. Alternatively, the modules can be implemented in hardware with microcode. The modules can be singular or representative of functionality spread over multiple components. Many other variations are possible.

The data packet parser 210 retrieves content from headers of data packets using data format templates. The content can be in ciphertext for inbound traffic and in cleartext for outbound traffic. The ciphertext hides information necessary to identify a particular blade working for a session.

The session table 330 stores a session id in association with a local station for a particular session along with other information, such as <protocol, local-gw/remote-gw IP and IPsec Key information>: <processing blade ID>. A first packet of a session populates or updates the session table 330 for use by subsequent data packets for the same session.

The IPsec routing table 320 stores a remote gateway address with a local station for a particular session.

The base switch 240 can run a VLAN over a dedicated channel connecting data to the processing blades, in one implementation. Each of the processing blades include a virtual interface to receive communications from the VLAN. A MAC address can be used to address data packets.

The chassis with multiple, independent, processing blades 250 includes several ports which connects to the processor and physically plug in processing blades. The port can be electrical contact teeth, a plug, or the like. Each of the processing blades includes a local processor, an encryption engine, and a decryption engine, and a deep packet inspector, preferably on a single physical chip or single physical board. Each blade can set up an IPsec tunnel for an assigned session. The multiple blades can be treated as a cluster when interfacing with other devices. In one embodiment, all traffic for a session or other instance is processed by the same blade, and sessions are load balanced between the blades.

When an outbound data packet requires IPsec protection, a blade on the chassis checks for SAs to set up an IPsec tunnel. If SAs are not cached, a request is sent to the processor (and IKE control engine 310 below) to set up a new IPsec tunnel. Once the new SAs are returned, the processor can forward them to the initiating blade to set up. In turn, IPsec parameters are stored in the IPsec table for subsequent set up.

FIG. 3 is a more detailed block diagram illustrating the load balancing engine 110A of the system 100 of FIG. 1, according to an embodiment. The load balancing engine 110A includes a load balancing engine 310, an IKE control engine 320, an encryption module 330, and a decryption module 340. The modules can be implemented in source code stored in non-transitory memory executed by a processor via an operating system and/or microcode. Alternatively, the modules can be implemented in hardware with microcode. The modules can be singular or representative of functionality spread over multiple components. Many other variations are possible.

The load balancing engine 220, in one embodiment assigns a processing blade from the plurality of processing blades to scan data packets for a specific session. The load balancing engine 220 manages a session table and an IPsec routing table by updating the session table with a particular security engine card assigned to the session and by updating the IPsec routing table for storing a remote IP address for a particular session. Outbound raw data packets of a particular session are parsed for matching cleartext tuple information prior to IPsec encryption, and inbound encrypted data packets of the particular session are parsed for matching cipher tuple information prior to IPsec decryption.

The IKE control engine 310 can be a daemon directed by a processor to negotiate SAs for an IPsec tunnel between the local network gateway device 110A and the remote network gateway device 110B (or IPsec tunnels between many other devices). Responses to IKE inquiries can be forwarded, by an operating system IKE policy of processing blades, automatically to the IKE control engine 310.

In more detail, a phase 1 exchange in the main mode uses IKE public key encryptions to authenticate itself with peer IKE entities, while a phase 2 exchange in the quick mode creates and manages IPsec SAs between two IKE daemons (e.g., sending gateway and receiving gateway). Once complete, information about the IPsec tunnel is sent to the load balancing engine 220. The information includes a remote gateway address and an IPsec tunnel key (with a lifetime) correlated with a source address, a security parameter index (SPI), and an algorithm, for example. The SAs can be unidirectional thereby requiring two sets of SAs for bidirectional data traffic, one set for each direction. There can also be separate SAs for AH and ESP transforms, wherein, for example, AH invokes the MD5 algorithm requiring a 128-bit key and the ESP invokes the 3DES algorithm requiring a 192-bit key. The load balancing engine 220 updates the session table and the IPsec routing table for handling subsequent data packets in the session. The tables can be pushed out to each of the processing blades or accessed as needed with a look-up query. If a data packet fails authentication, it may be dropped upon receipt. In one embodiment, SAs are set up responsive to a first data packet of a new session.

An operating system at a kernel layer can incorporate the IKE control engine 310, or software updates can patch the operating system or add application-level software.

The IPSec encrypter 254 on the assigned processing blade to detect outbound data packets assigned to the assigned processing blade. For instance, a daemon can always or periodically listen to a bus line broadcasting assignments. In another instance, a bit is set for assignments at a specific memory location that can be periodically checked. Contents of a data packet and some (or all) header fields are encrypted from cleartext into cyphertext. In one embodiment, a source address header and a destination address header are encrypted into contents of an encrypted data packet. New headers can be attached with information necessary for IPsec routing, without regard to information necessary for load balancing.

The IPSec decrypter 256 on the assigned processing blade to detect inbound data packets routed to the assigned processing blade from the session table and forward to the station. Contents of a data packet are decrypted from ciphertext into cleartext. The decrypted contents can include headers for an encapsulated packet, such as the source address header and the destination address header. Because these fields needed for session awareness are not exposed until after load balancing, the load balancing engine employs the session table to provide session awareness.

II. Methods for Multi-Blade IPsec Load Balancing (FIGS. 4-5)

Figure 4:
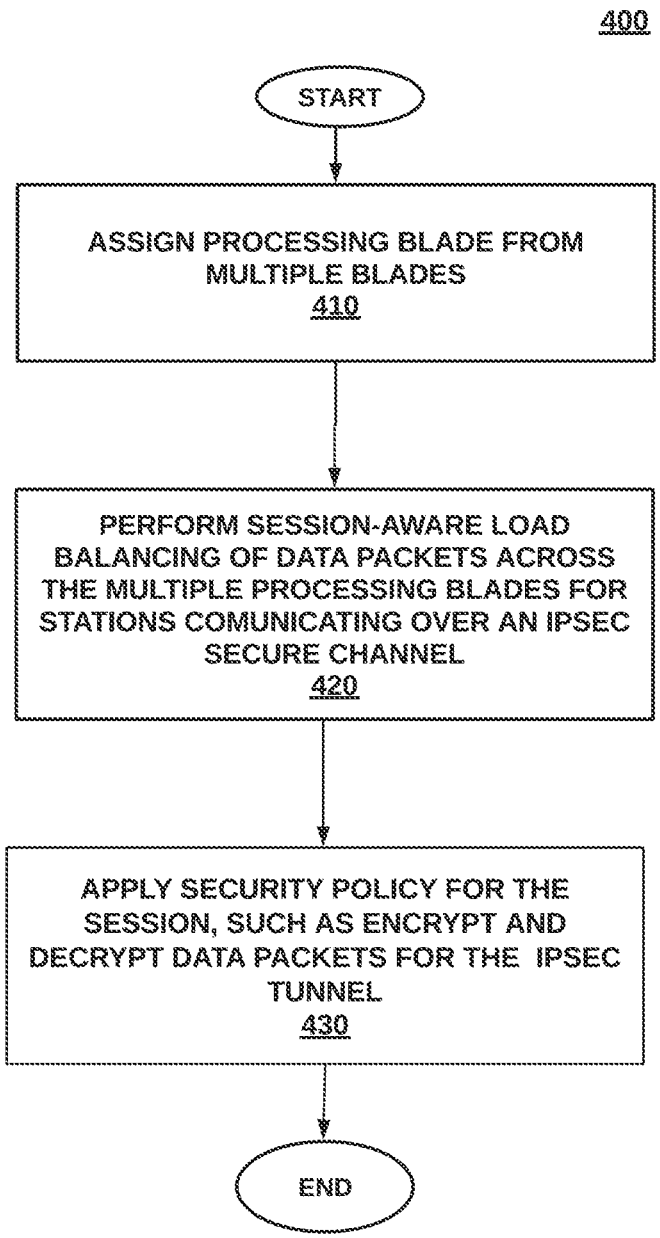
FIG. 4 is a high-level flow diagram illustrating a method for transmitting from a local station over IPsec to a remote station, according to one preferred embodiment.
Figure 5:
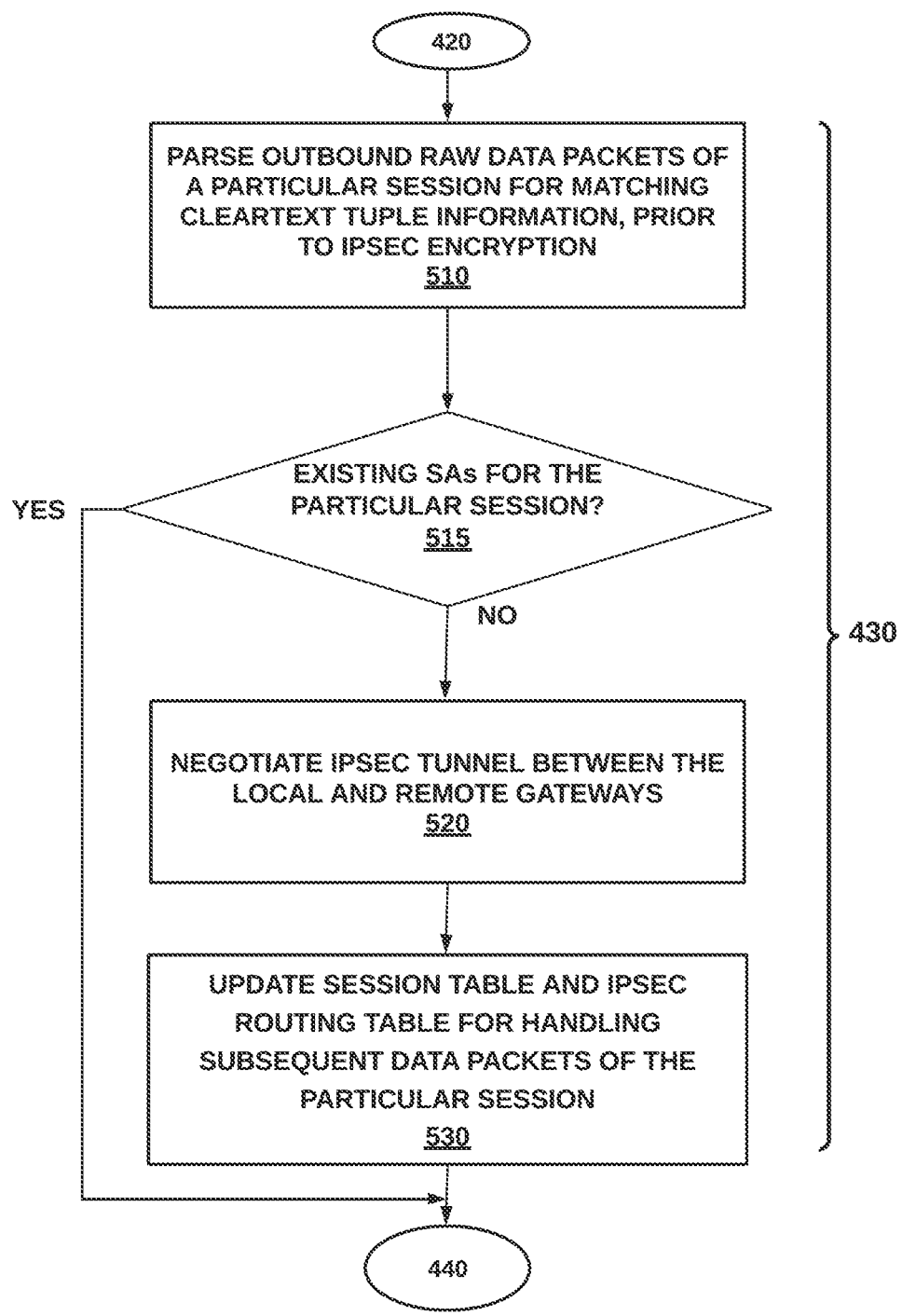
FIG. 5 is a more detailed flow diagram illustrating a step of session-aware load balancing of data packets across the multiple processing blades for the plurality of stations over an IPsec secure channel for the method of FIG. 4, according to one embodiment.

FIG. 4 is a high-level flow diagram illustrating a method for facilitating IPsec communications between local and remote stations, according to one preferred embodiment. The method 400 can be implemented, for example, by the local network gateway device 110A of system 100. The steps are merely representative groupings of functionality, as there can be more or fewer steps, and the steps can be performed in different orders. Many other variations of the method 400 are possible.

Responsive to detecting a data packet from a new session (for example by hash matching), at step 405, then at step 410, a processing blade is assigned from the multiple processing blades available to process the data packet for transmission over an IPsec tunnel. The load balancing engine manages a session table and an IPsec routing table by updating the session table with a particular security engine card assigned to the session and by updating the IPsec routing table with a remote IP address for a particular session. In one case, the remote IP address is not known until the IPsec tunnel has been set up. In another case, the same information is relied upon for inbound data packets, which do not have an unencrypted session identifier but do have a remote gateway address, for finding the session identifier.

At step 420, session-aware load balancing of data packets is performed across the multiple processing blades for one or many stations communicating over an IPsec secure channel. One station can maintain different sessions that are handled over different processing blades. As a result, the high-powered group of hardware is coordinated for even higher throughput with load balancing. One example of step 420 is shown in detail in FIG. 5.

At step 510 of FIG. 5, outbound raw data packets of a particular session are parsed for matching cleartext tuple information prior to IPsec encryption, and inbound encrypted data packets of the particular session are parsed for matching cipher tuple information prior to IPsec decryption.

If no SAs exist for the particular session, at step 515, then at step 520, an IPsec tunnel is negotiated between the local network gateway device and a remote network gateway device.

At step 530, SA information about the IPsec tunnel is sent to the load balancing engine including a remote gateway address and an IPsec tunnel key correlated with a source address and a destination address. The session table and the IPsec routing table are updated for handling subsequent data packets in the session.

Returning to FIG. 4, at step 430, inbound data packets assigned to the processing blade from the session table are routed to the assigned blade for processing and forwarded to the appropriate station.

III. Generic Computing Environment (FIG. 6)

Figure 6:
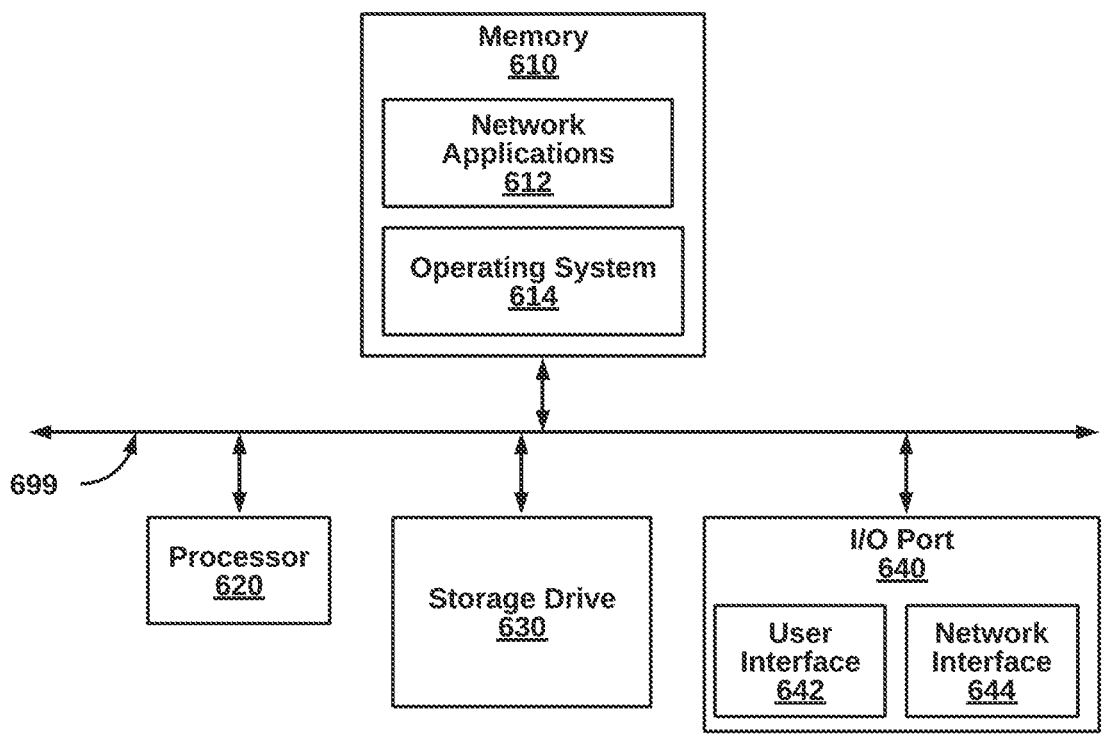
FIG. 6 is a high-level block diagram illustrating a computing device as an example hardware implementation of network devices herein, according to an embodiment.

FIG. 6 is a block diagram illustrating a computing device 600 capable of implementing components of the system, according to an embodiment. The computing device 600 of the present embodiment, includes a memory 610, a processor 620, a storage drive 630, and an I/O port 640. Each of the components is coupled for electronic communication via a bus 699. Communication can be digital and/or analog and use any suitable protocol. The computing device 600 can be any of components of the system 100 (e.g., the local network gateway device 110A, the remote network gateway device 110B, the local access point 120A, the remote access point 120B, the local station 130A, and the remote station 130B), other networking devices (e.g., an access point, a firewall device, a gateway, a router, or a wireless station), or a disconnected device.

Network applications 612 (e.g., the load balancing engine 112) can be network browsers, daemons communicating with other network devices, network protocol software, and the like. An operating system 614 within the computing device 600 executes software, processes. Standard components of the real OS environment 614 include an API module, a process list, a hardware information module, a firmware information module, and a file system. The operating system 614 can be FORTIOS, one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g., an RF antennae) connects to a medium such as Ethernet or Wi-Fi for data input and output. Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, layer 2/3 routing, content inspection, content filtering, firewall, traffic shaping, application control, Voice over Internet Protocol (VoIP) support, Virtual Private Networking (VPN), IPsec, Secure Sockets Layer (SSL), anti-virus, intrusion detection, intrusion prevention, Web content filtering, spyware prevention and anti-spam. Examples of network appliances include, but are not limited to, network gateways and network security appliances (e.g., FORTI-GATE family of network security appliances and FORTI-CARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI-WIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A local network gateway device having multiple processing blades coupled to a data communication network with a remote network gateway device and a local network with a plurality of stations, for session-aware load balancing of data packets across the multiple processing blades for the plurality of stations over an Internet Protocol security (IPsec) secure channel, network gateway device comprising:
   a processor;
   a network interface communicatively coupled to the processor and communicatively coupled to exchange data packets over the data communication network, wherein a first data packet of a specific session is received from the station as outbound traffic;
   a plurality of security engine cards coupled through a common chassis, each security engine card performing firewall scanning, and the common chassis communicatively coupled with the processor;
   a load balancing engine to assign a processing blade from the plurality of processing blades to scan data packets, wherein the load balancing engine manages a session table and an IPsec routing table by updating the session table with a particular security engine card assigned to the session and by updating the IPsec routing table for storing a remote Internet Protocol (IP) address for a particular session, and wherein outbound raw data packets of a particular session are parsed for matching cleartext tuple information prior to IPsec encryption, and inbound encrypted data packets of the particular session are parsed for matching cipher tuple information prior to IPsec decryption; and a memory communicatively coupled to the processor and storing:

an Internet Key Exchange (IKE) control engine to send information about an IPsec tunnel to the load balancing engine including a remote gateway address and an IPsec tunnel key correlated with a source address and a destination address, wherein the load balancing engine updates the session table and the IPsec routing table for handling subsequent data packets in the session, wherein the network interface receives wherein an encryption engine on the assigned processing blade encrypts data packets from the session and transmits over an IPsec tunnel, and a decryption engine on the assigned processing blade receives data packets over the IPsec tunnel and decrypts data packets from the session and forwards to the station.

2. The local network gateway device of claim 1, wherein the load balancing engine uses headers from the outbound data packets to identify the assigned processing blade for the session, wherein contents of the outbound data packets are stored in cleartext.

3. The local gateway device of claim 1, wherein the load balancing engine uses headers from the inbound data packets to identify the assigned processing blade for the session, wherein contents of the inbound data packets are stored in ciphertext.

4. The local gateway device of claim 1, wherein the load balancing engine generates an ESP header with a subnet header and encapsulates the output data packets prior to forwarding to the assigned processing blade for encryption, wherein the ESP header provides a remote gateway address for routing output data packets after encryption.

5. The local gateway device of claim 1, wherein the IKE control engine to negotiate the IPsec tunnel with the remote gateway device.

6. The local gateway device of claim 1, wherein the IKE control engine receives a request from the remote gateway device to set up an IPsec tunnel for a second session with a second local station or a second remote station.

7. A method in local network gateway device having multiple processing blades coupled to a data communication network with a remote network gateway device and a local network with a plurality of stations, for preventing key failure in BSS (Basic Service Set) fast transition of a station attempting to connect from a source access point managed by a Wi-Fi controller to the target access point also managed by the Wi-Fi controller, the method comprising the steps of:

assigning a processing blade from the plurality of processing blades to scan data packets;

managing a session table and an Internet Protocol security (IPsec) routing table by updating the session table with a particular security engine card assigned to the session and by updating the IPsec routing table for storing a remote Internet Protocol (IP) address for a particular session;

parsing outbound raw data packets of a particular session are parsed for matching cleartext tuple information prior to IPsec encryption, and inbound encrypted data packets of the particular session are parsed for matching cipher tuple information prior to IPsec decryption;

sending information about an IPsec tunnel to a load balancing engine including a remote gateway address and an IPsec tunnel key correlated with a source address and a destination address;

updating the session table and the IPsec routing table for handling subsequent data packets in the session;

detecting outbound data packets assigned to the assigned processing blade; and detecting inbound data packets assigned to the assigned processing blade from the session table and forward to the station.

8. The method of claim 7, wherein the load balancing engine uses headers from the outbound data packets to identify the assigned processing blade for the session, wherein contents of the outbound data packets are stored in cleartext.

9. The method of claim 7, wherein the load balancing engine uses headers from the inbound data packets to identify the assigned processing blade for the session, wherein contents of the inbound data packets are stored in ciphertext.

10. The method of claim 7, wherein the load balancing engine generates an ESP header with a subnet header and encapsulates the output data packets prior to forwarding to the assigned processing blade for encryption, wherein the ESP header provides a remote gateway address for routing output data packets after encryption.

11. The method of claim 7, wherein a Internet Key Exchange (IKE) control engine to negotiate the IPsec tunnel with the remote gateway device.

12. The method of claim 7, wherein the IKE control engine receives a request from the remote gateway device to set up an IPsec tunnel for a second session with a second local station or a second remote station.

13. A method in a non-transitory computer-readable media in local network gateway device having multiple processing blades coupled to a data communication network with a remote network gateway device and a local network with a plurality of stations, the method for preventing key failure in BSS (Basic Service Set) fast transition of a station attempting to connect from a source access point managed by a Wi-Fi controller to the target access point also managed by the Wi-Fi controller, the method comprising the steps of:

assigning a processing blade from the plurality of processing blades to scan data packets;

managing a session table and an Internet Protocol security (IPsec) routing table by updating the session table with a particular security engine card assigned to the session and by updating the IPsec routing table for storing a remote Internet Protocol (IP) address for a particular session;

parsing outbound raw data packets of a particular session are parsed for matching cleartext tuple information prior to IPsec encryption, and inbound matching cipher encrypted data packets of the particular session are parsed for tuple information prior to IPsec decryption;

sending information about an IPsec tunnel to a load balancing engine including a remote gateway address and an IPsec tunnel key correlated with a source address and a destination address;

updating the session table and the IPsec routing table for handling subsequent data packets in the session;

detecting outbound data packets assigned to the assigned processing blade; and detecting inbound data packets assigned to the assigned processing blade from the session table and forward to the station.

14. The method of claim 13, wherein the load balancing engine uses headers from the outbound data packets to identify the assigned processing blade for the session, wherein contents of the outbound data packets are stored in cleartext.

15. The method of claim 13, wherein the load balancing engine uses headers from the inbound data packets to identify the assigned processing blade for the session, wherein contents of the inbound data packets are stored in ciphertext.

16. The method of claim 13, wherein the load balancing engine generates an ESP header with a subnet header and encapsulates the output data packets prior to forwarding to the assigned processing blade for encryption, wherein the ESP header provides a remote gateway address for routing output data packets after encryption.

17. The method of claim 13, wherein a Internet Key Exchange (IKE) control engine to negotiate the IPsec tunnel with the remote gateway device.

18. The method of claim 13, wherein the IKE control engine receives a request from the remote gateway device to set up an IPsec tunnel for a second session with a second local station or a second remote station.

* * * * *